United States Patent
Fatemi et al.

(10) Patent No.: US 10,763,772 B1
(45) Date of Patent: Sep. 1, 2020

(54) EXCITATION OF CYCLOIDAL ELECTRIC MACHINE

(71) Applicant: GM Global Technology Operations LLC, Detroit, MI (US)

(72) Inventors: Alireza Fatemi, Canton, MI (US); Derek F. Lahr, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 16/394,400

(22) Filed: Apr. 25, 2019

(51) Int. Cl.
| | |
|---|---|
| *H02P 25/086* | (2016.01) |
| *H02K 11/21* | (2016.01) |
| *H02K 11/27* | (2016.01) |
| *H02K 41/06* | (2006.01) |
| *H02K 11/33* | (2016.01) |

(52) U.S. Cl.
CPC .......... *H02P 25/086* (2013.01); *H02K 11/21* (2016.01); *H02K 11/27* (2016.01); *H02K 11/33* (2016.01); *H02K 41/065* (2013.01); *H02K 2201/03* (2013.01); *H02K 2201/18* (2013.01)

(58) Field of Classification Search
CPC ....... H02P 25/086; H02K 11/21; H02K 11/27; H02K 11/33
USPC ........................................................ 318/115
See application file for complete search history.

(56) References Cited

U.S. PATENT DOCUMENTS

| | | | |
|---|---|---|---|
| 4,181,479 A * | 1/1980 | Ross | F01C 1/104 418/151 |
| 4,914,330 A | 4/1990 | Pierrat | |
| 5,332,954 A * | 7/1994 | Lankin | B60L 50/52 318/139 |
| 5,448,117 A | 9/1995 | Elliott | |
| 8,907,601 B2 * | 12/2014 | Okawa | B60L 7/14 318/373 |
| 9,068,456 B2 * | 6/2015 | Yarr | F01C 1/103 |
| 9,669,701 B2 | 6/2017 | Bolt | |
| 9,890,832 B2 | 2/2018 | Kurth et al. | |
| 10,023,406 B2 | 7/2018 | Klubertanz et al. | |
| 10,090,747 B2 | 10/2018 | Hofmeister | |
| 2010/0090629 A1 * | 4/2010 | Tang | B60L 15/025 318/400.09 |
| 2012/0217916 A1 * | 8/2012 | Wu | H02P 21/0003 318/400.11 |
| 2015/0354280 A1 * | 12/2015 | Downton | F03B 13/02 175/107 |
| 2016/0329799 A1 * | 11/2016 | Hofmeister | H05K 1/181 |
| 2017/0110956 A1 * | 4/2017 | Morris | H02K 49/102 |

(Continued)

*Primary Examiner* — Kawing Chan
(74) *Attorney, Agent, or Firm* — Quinn IP Law

(57) ABSTRACT

An electrical system includes an inverter connected to AC and DC voltage buses, a cycloidal electric machine connected to the PIM via the AC voltage bus, and a controller. The machine's rotor is eccentric with respect to the stator, an airgap between the stator and rotor is smaller at an instantaneous center of rotation of the rotor than elsewhere around a circumference of the rotor, and the rotor moves with two degrees of freedom (2DOF), i.e., rotating and orbiting motion. The controller receives a torque command, the rotor position signal, and the current signals, and in response identifies an optimal stator pole or pole pair located proximate the instantaneous center of rotation and energizes the optimal stator pole or pole pair via the PIM prior to energizing another stator pole or pole pair of the stator.

16 Claims, 8 Drawing Sheets

(56) References Cited

U.S. PATENT DOCUMENTS

2019/0222096 A1\* 7/2019 Bastian, II ............... H02K 1/27
2020/0088159 A1\* 3/2020 Stoesser ............... H02K 49/102

\* cited by examiner

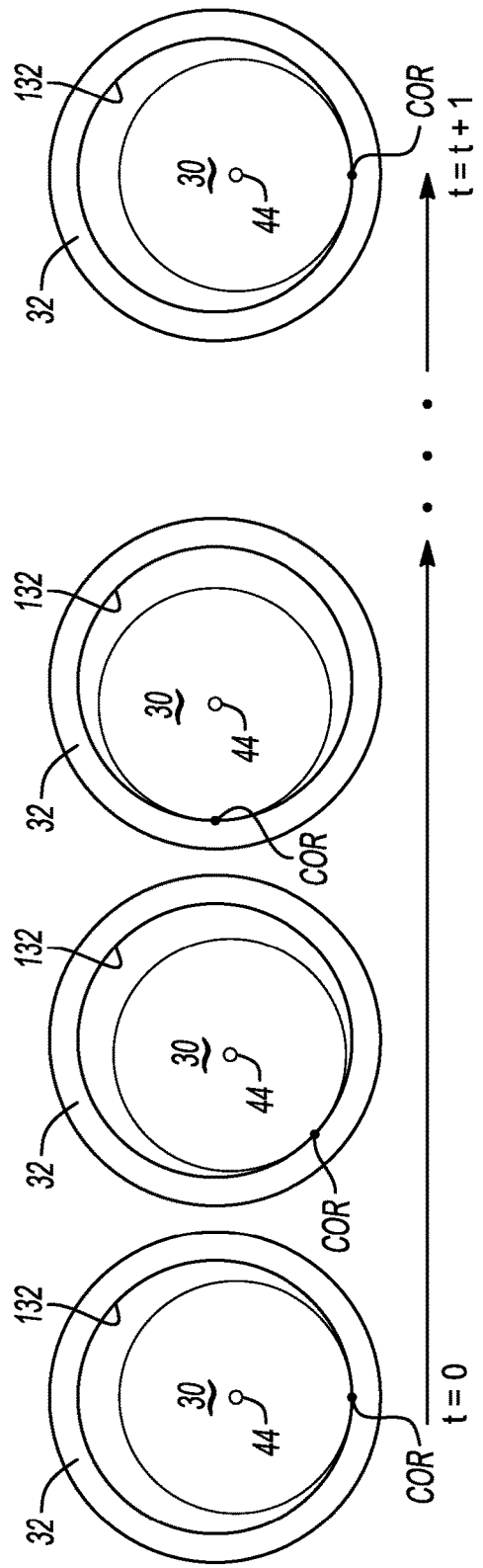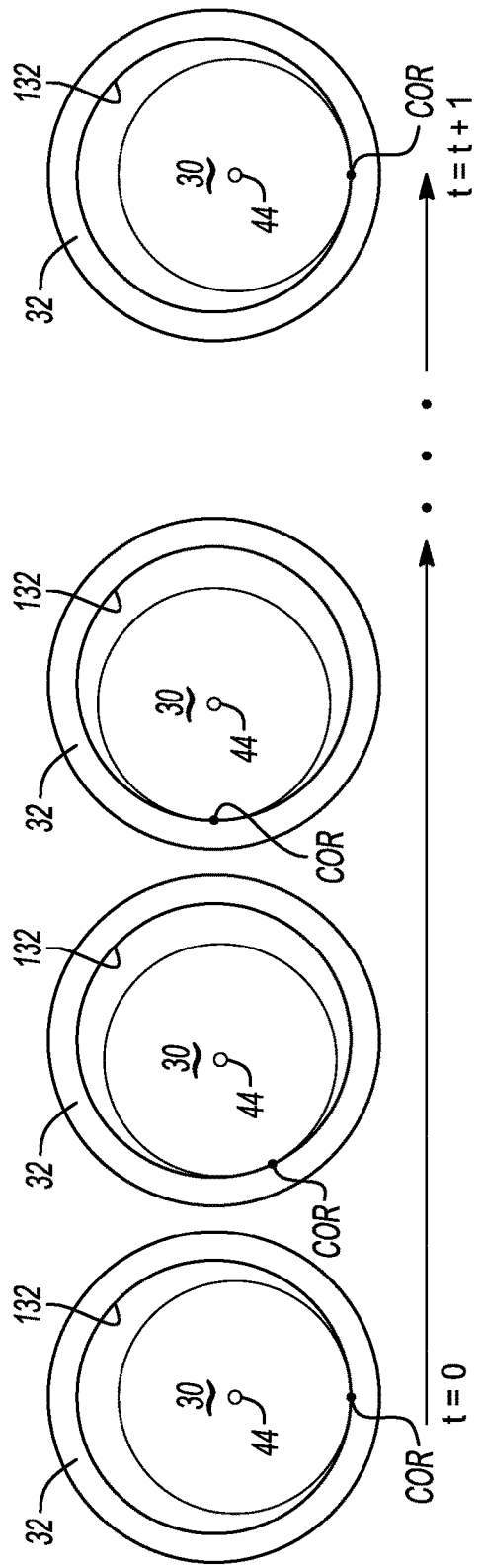

EXCITATION OF CYCLOIDAL ELECTRIC MACHINE

INTRODUCTION

Rotary electric machines configured as motors or electric generators include a rotating member ("rotor") and a stationary member ("stator"). The rotor may be disposed radially within or outside of the stator. Radial slots are defined between equally-spaced stator teeth which project radially from a perimeter of a cylindrical stator core. The stator slots are filled with windings of copper which, when energized, form a set of stator electromagnets and corresponding stator poles. A polyphase input voltage is sequentially applied to individual phase leads of the various stator windings to generate a rotating magnetic field.

Reluctance machines are of particular type of rotary electric machine used in high-power/high-torque applications. In a variable reluctance machine, for instance, magnetic poles are induced in a ferrous rotor core when the above-noted stator electromagnets are energized. Forces generated by magnetic reluctance of the ferrous rotor core cause the rotor's magnetic poles to seek alignment with the nearest stator pole. That is, as magnetic flux passes through the rotor core and follows the path of least reluctance, the nearest rotor pole will attempt to align with the most proximate stator pole. However, as the stator field continues to rotate, so too does the rotor, with the stator poles leading the rotor poles so as to produce desired machine rotation.

SUMMARY

The present disclosure relates to improvements in the overall control of reluctance-based rotary electric machines and other radial flux-type machines having a cylindrical stator and an eccentrically-positioned rotor, i.e., a cycloidal electric machine. As described below, rotor eccentricity enables the rotor to orbit with respect to the stator, e.g., radially within a surrounding stator core in a non-limiting embodiment. As the rotor's output shaft rotates about its own axis of rotation, an eccentric rotor enables construction of an electric machine with two degrees of freedom (2DOF) of motion, i.e., rotation/rolling motion and orbiting motion. Rotor eccentricity also allows the rotor to be reduced in size relative to a typical concentric stator-rotor configuration.

The present approach seeks to optimize performance and torque-generating efficiency of a cycloidal electric machine of this type. Control theory applicable to electric machines having a concentric rotor-stator arrangement is not readily extended to the control of machines having an eccentric rotor. A cycloidal reluctance motor, for instance, as a unique operation that is able to take advantage of radial electromagnetic forces within an airgap circumferentially separating the rotor from the stator. Such radial forces, which are as will be appreciated are unused in concentric machines that rely exclusively on tangential forces, are described in detail below.

To efficiently control the present cycloidal machine, a controller is programmed to identify, in real-time, which of one of a plurality of stator windings or poles to excite, with the controller doing so based on the rotor's present angular position and rotational speed, as well as the present load/torque demand and the machine's present motoring or regenerating operating mode. The controller is thus configured to ensure maximum torque per unit amp (MTPA) operation of the electric machine, and in this increase the range of beneficial applications for cycloidal machines of the disclosed types.

Further with respect to rotor eccentricity, the rotary electric machines described herein are "cycloidal" in the sense that the rotor is constrained to move with the 2DOF noted briefly above: (1) rotary or rolling motion around the rotor's axis of rotation, and (2) orbiting motion around the stator's axis. For a typical rotary electric machine, the electromagnetic torque present within the stator-rotor airgap may be derived using the following equation [1], with t and r respectively denoting radial and tangential torque components in an example cylindrical coordinate system:

$$T_e = F_t R L_{ef}. \qquad [1]$$

In equation [1], $T_e$ is the electromagnetic torque in newton-meters, R is the average radius of the airgap in meters, $L_{ef}$ the effective stack length of the active materials of the electric machine, also in meters, and $F_t$ is the tangential forces present within the airgap in newtons. The tangential forces, $F_t$, are defined as:

$$F_t = \frac{P}{2} \int_0^{2\pi} f_t(\phi_r) R \frac{d}{dt} \phi_r \qquad [2]$$

where P is the number of poles of the electric machine, $f_t$ represents the tangential component of the airgap force density per unit length, and $\phi_r$ is the electrical angle covering each pole pair in radians.

According to the relationships expressed in equations [1] and [2], the radial airgap forces, which are several times larger than the tangential forces, do not contribute to the output torque of the electric machine. The embodiments with the airgap-reducing structural elements described in detail below are therefore intended to incorporate otherwise unused radial airgap forces into the output torque in order to realize certain performance advantages, including the production of higher levels of motor output torque at lower motor speeds with a rotor having reduced size.

An electrical system according to an example embodiment includes direct current (DC) and alternating current (AC) voltage buses, a power inverter module (PIM) connected to the DC and AC voltage buses, a polyphase cycloidal electric machine connected to the PIM via the AC voltage bus, and a controller. The electric machine has a stator and a rotor with respective stator and rotor axes. The rotor axis is eccentric with respect to the stator axis, an airgap is defined between the stator and rotor that is smaller at an instantaneous center of rotation of the machine than elsewhere around a circumference of the rotor, and the rotor moves with two degrees of freedom (2DOF). The 2DOF includes rotating motion about the rotor axis and orbiting motion about the stator axis. A position sensor measures an angular position of the rotor, and outputs a rotor position signal indicative of the angular position. Current sensors connected to the AC voltage bus are configured to measure phase currents to the electric machine, and to output current signals indicative of the phase currents.

The controller receives a set of input signals, including a torque command, the rotor position signal, and the current signals. Responsive to the input signals, the controller is configured to identify an optimal stator pole or pole pair located proximate the center of rotation of the electric machine, and to energize the optimal stator pole or pole pair via the PIM prior to energizing another stator pole or pole pair of the stator to generate maximum torque per unit amp.

The controller, based on the current signals, also determines when an operating mode of the electric motor is a partial-torque/partial-load condition, with the controller energizing the optimal stator pole or pole pair.

The controller, based on the current signals, may also determine when a current operating mode is a peak-torque/peak-load condition, and sequentially energize the optimal stator pole or pole pair and every other stator pole or pole pair located in a given symmetrical half of the electric machine.

The cycloidal electric machine may be a reluctance machine having at least three phases, and possibly eight or more phases, with twelve phases being a possible embodiment.

A downstream coupling mechanism may be coupled to the rotor and a driven load, and configured to translate the 2DOF into 1DOF, with the 1DOF being the rotating motion without the orbiting motion. The driven load may be a drive axle of a vehicle.

The controller may be configured, responsive to an increasing torque command, to increase a period of excitation of each of the stator phases to exceed $$\frac{2\pi}{PH},$$

wherein PH is a total number of the stator phases in the electric machine.

The controller may also be configured, responsive to an increasing torque command short of peak-torque operation of an example twelve-phase electric machine, as indicated by the input signals, to alternate energizing of two of the stator phases with energizing of four of the stator phases.

Also disclosed herein is a method for controlling the cycloidal electric machine noted above. An embodiment of the method includes measuring an angular position of the rotor using a position sensor, outputting a rotor position signal indicative of the angular position, measuring phase currents to the electric machine via a plurality of current sensors, and outputting current signals indicative of the phase currents. The method further includes receiving a set of input signals via a controller, including a torque command, the rotor position signal, and the current signals, and identifying, via the controller based on the input signals, an optimal stator pole or pole pair located proximate the instantaneous center of rotation of the electric machine. The controller then energizes the optimal stator pole or pole pair, via a power inverter module in communication with the controller, prior to energizing another stator pole or pole pair of the stator.

The method may include determining when a current operating mode is a partial-torque condition based on the current signals, and then energizing only the optimal stator pole or pole pair during an onset of the partial-torque condition.

The method may further include determining when a current operating mode is a peak-torque condition, and then energizing the optimal stator pole or pole pair and every other stator pole or pole pair located in a given symmetrical half of the electric machine.

Responsive to an increasing torque command, the method may include increasing a period of excitation of each of the stator coils to exceed $$\frac{2\pi}{PH},$$

via the controller, with PH being the number of electrical phases of the electric machine. Responsive to an increasing torque command, the method may include, for an example twelve-phase machine during increasing torque/load conditions, alternating energizing of two stator phases with energizing of four stator phases.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIGS. 3 and 4 are schematic illustrations of respective rotating and orbiting motion providing two degrees of freedom of motion of the rotary electric machine of FIG. 2.

Figure 1:
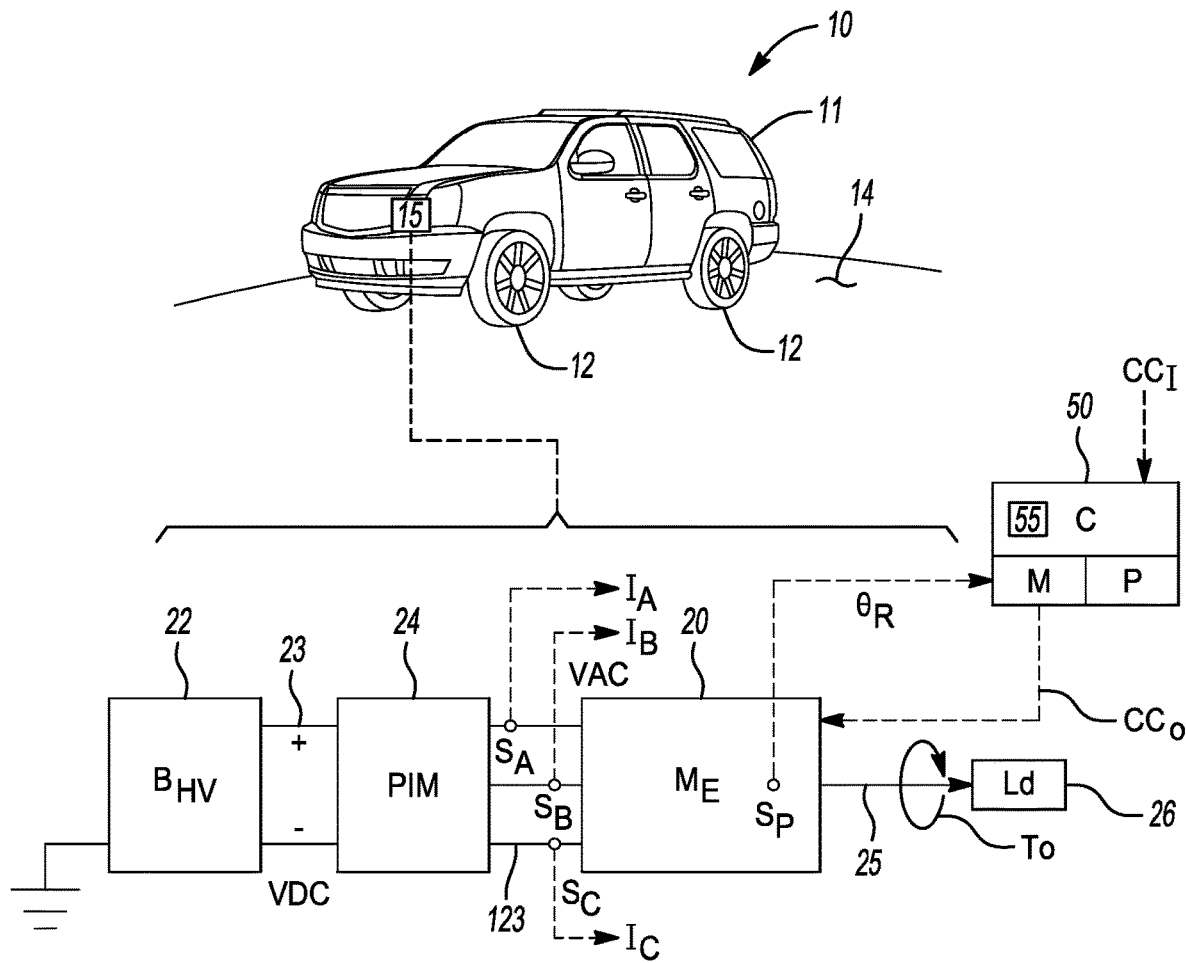
FIG. 1 is a schematic illustration of an example vehicular electrical system having a cycloidal rotary electric machine and a controller configured to optimize excitation of stator windings of the electric machine using the present methodology.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electrical system 15 is shown schematically in FIG. 1. The electrical system 15 may be used in various systems, including as part of a drivetrain of a motor vehicle 10 having a body 11 and road wheels 12 in rolling contact with a road surface 14. The electrical system 15 may be used in other types of vehicles such as aircraft, watercraft, and rail vehicles, or in other mobile non-vehicular applications such as robots and mobile platforms. Stationary applications may likewise benefit from use of the electrical system 15, and therefore the motor vehicle 10 of FIG. 1 is just one possible beneficial application of the present teachings.

The electrical system 15 includes a rotary electric machine ($M_E$) 20, e.g., a cycloidal reluctance machine. The electric machine 20 has a rotatable output member 25 that is coupled to a rotor 30 (see FIG. 2) to deliver output torque (arrow $T_O$) to a coupled load (Ld) 26, e.g., the road wheels 12 or a drive axle (not shown). The rotor 30 is sufficiently balanced to provide a low level of noise, vibration, and harshness during operation of the electric machine 20, and to ensure that rotor 30 does not wobble or vibrate beyond its constrained two degrees of freedom (2DOF).

As will be understood by those of ordinary skill in the art, reluctance machines, e.g., synchronous, switched, or variable reluctance machines, are characterized by an absence of permanent magnets on the rotor 30, and instead induce non-permanent magnetic poles on the rotor 30. The output torque (arrow $T_O$) is ultimately generated as a result of forces on the rotor 30 due to magnetic reluctance. The electric machine 20 is operable for providing motion with the above-described 2DOF, i.e., rotary and orbiting motion as respectively shown in FIGS. 3 and 4. Disclosed enhancements to operation of the cycloidal electric machine 20 are intended to provide maximum torque per unit amp (MTPA) generated by the electric machine 20, particularly by providing optimal excitation of the individual windings forming the poles of the stator 32 of FIG. 2 during both motoring and regenerating modes of operation.

In the illustrated example embodiment of FIG. 1, the electrical system 15 includes a battery ($B_{HV}$) 22 and a power inverter module (PIM) 24. The battery 22 may optionally have a relatively high voltage capacity, e.g., 60-volts or more depending on the embodiment, and thus "high-voltage" is indicated by subscript "HV". The electric machine 20 may be embodied as a polyphase electric motor, for instance, and thus may be electrically connected to an AC bus 123, with the electric machine 20 energized by an AC voltage (VAC) from the PIM 24. The PIM 24 in turn is connected to the battery 22 via positive (+) and negative (−) rails of a DC voltage bus 23, with a DC voltage (VDC) supplied by the DC voltage bus 23 to the PIM 24 and vice versa depending on whether the electric machine 20 functions in its capacity as a motor or as a generator.

Operation of the electrical system 15 may be regulated in real-time by a controller (C) 50 via control signals (arrow $CC_O$), which may be transmitted to the various controlled components in the electrical system 15 wirelessly and/or over low-voltage transfer conductors. The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

With respect to the operation of the controller 50 in an excitation circuit of the electric machine 20, the controller 50 receives input signals (arrow $CC_I$) from the electrical system 15 indicative of the present dynamic and electrical state of the electric machine 20. In particular, the controller 50 receives, as the input signals (arrow $CC_I$), measured current signals (arrows $I_A$, $I_B$, and $I_C$) from corresponding current sensors $S_A$, $S_B$, and $S_C$, with the current sensors $S_A$, $S_B$, and $S_C$ measuring and reporting phase currents for representative A, B, and C phases of a simplified three-phase embodiment of the electric machine 20.

The controller 50 also receives a measured angular position (arrow $\theta_R$) of the rotor 30 from a position sensor $S_P$, e.g., a rotary encoder positioned with respect to the rotor 30. The controller 50 is programmed with commutator/current regulation (REG) logic 55, which the controller 50 executes as part of the present method 100. Operation of the controller 50 with respect to excitation control of the electric machine 20 is set forth below with reference to FIGS. 5-13B, with a description of the eccentricity of the rotor 30 provided with reference to FIGS. 2-4.

Figure 2:
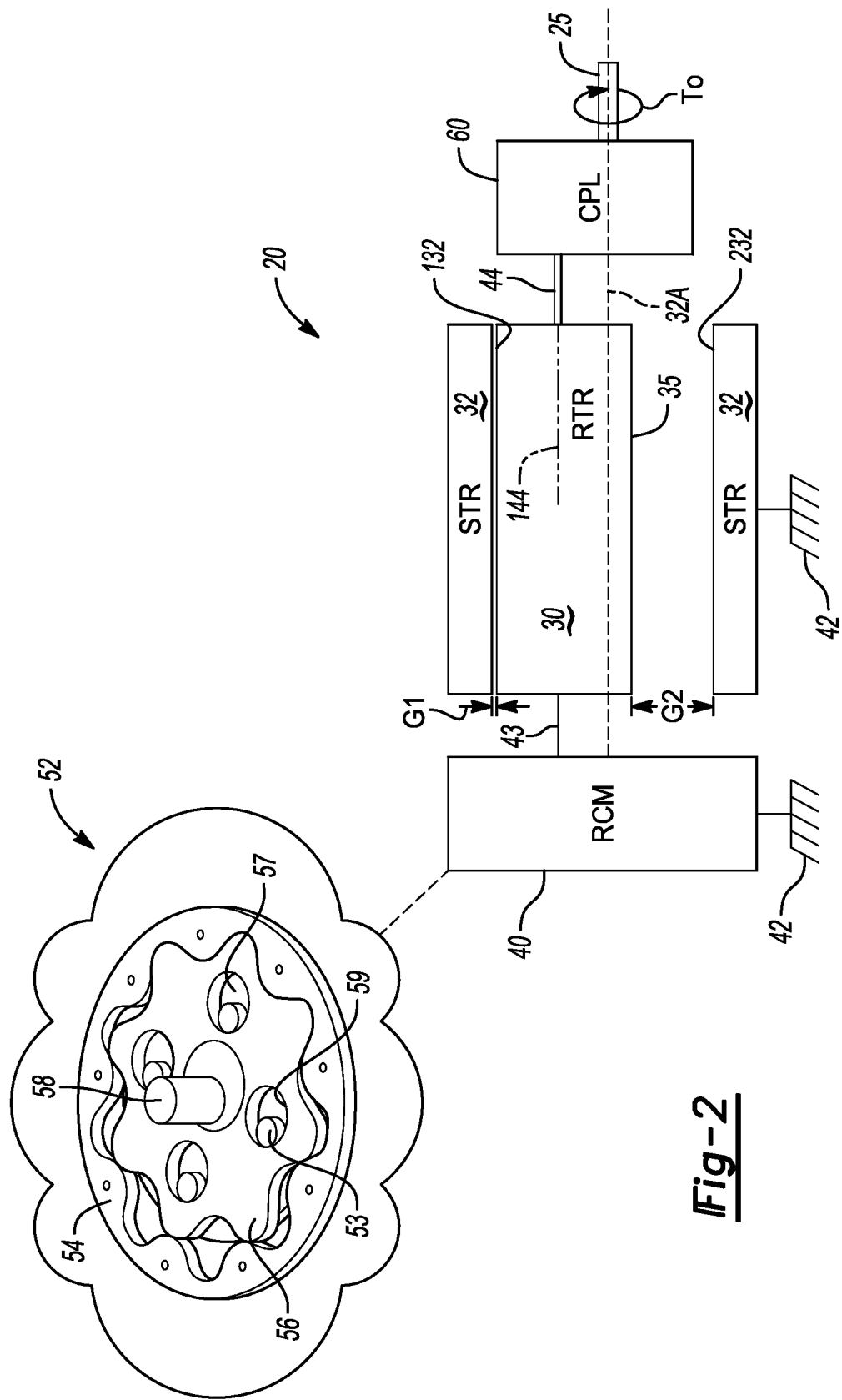
FIG. 2 is a schematic illustration of a cycloidal electric machine usable as part of the example electrical system shown in FIG. 1.

Rotor Eccentricity: FIG. 2 schematically depicts the rotor (RTR) 30 as eccentrically-positioned and radially-disposed with respect to the stator (STR) 32, the latter of which may be grounded to a stationary member 42 as shown. The electric machine 20 may include a housing (not shown) in which the rotor 30, the stator 32, and other components are disposed and structurally supported. The stator 32 may be separated from the rotor 30 by the above-noted airgap (G1, G2), with the stator 32 in continuous contact with or close proximity to the rotor 30 at an instantaneous center of rotation (COR) (see FIG. 3), i.e., the closest proximate point between the stator 32 and rotor 30, and without sliding against the rotor 30. Eccentric positioning of the rotor 30 relative to the stator 32 provides the rotor 30 with the above-noted 2DOF, i.e., rotating motion and orbiting motion.

The rotor 30 is surrounded or circumscribed by the stator 32 in the illustrated example cylindrical embodiment of FIG. 2, with an output shaft 44 of the rotor 30 free to rotate about a rotor axis 144, while the rotor 30 orbits around a center axis 32A of the stator 32, with the center axis 32A also referred to herein as the stator axis 32A. The rotor 30 and stator 32 are separated by the airgap (G1, G2), with G1 and G2 referring to the airgap's different relative size at different circumferential locations. That is, depending on the orbiting position of the rotor 30 within the stator 32 at a given time instant, the rotor 30 may approach an inner circumferential surface 132 of the stator 32, i.e., minimal airgap G1, reaching its closest point at the center of rotation (COR).

At such a position, the rotor 30 is located farthest away from a diametrically-opposite surface 232 of the stator 32, which in turn results in the airgap G2 at the illustrated instant in time being larger than airgap G1. As the rotor 30 continues to orbit radially within the stator 32, however, the relative size of airgaps G1 and G2 continuously changes, i.e., the airgap G2 becomes smaller than airgap G1 as the rotor 30 orbits 180-degrees away from the relative position depicted in FIG. 2. As the size of the airgap affects output torque capability of the electric machine 20, the controller 50 of FIG. 1 is programmed to excite the windings of the stator 32 in a particular manner, using the specific input signals (arrow $CC_I$), to achieve MTPA of the electric machine 20.

The electric machine 20 may be connected to or integrally includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58 that rotates in a direction opposite to that of the output shaft 44.

General operation of the electric machine 20 may be understood with reference to the cycloidal gear set 52 shown as an inset in FIG. 2. The cycloidal gear set 52 has a grounded/stationary outer gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown schematically in FIG. 1 may incorporate certain structural functional aspects of the example cycloidal gear set 52 into its constituent structure without bodily incorporating the cycloidal gear set 52 itself. For instance, the function of the stationary outer gear element 54 and the cycloidal disc 56 may be integrated into the structure of the RCM 40, with an input member 43 of the rotor 30 possibly bolted to structure of the RCM 40 corresponding to cycloidal disc 56. Such structure enables the rotor 30 to be constrained so as to rotate about rotor axis 144 and, at the same time, to orbit about stator axis 32A. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer gear 54.

The rotary electric machine 20 may include an optional coupling mechanism (CPL) 60 configured to translate rotation of the rotor 30 from rotor axis 144 to the driven load 26 (see FIG. 1). The CPL 60 may be positioned downstream of the rotor 30, i.e., coupled to the output member 44 and configured to translate the 2DOF motion of the rotor 30 into 1DOF motion. As used herein, the term "1DOF motion" describes rotation of the output member 25 and the connected driven load 26 without accompanying orbiting motion. When the driven load 26 includes the above-noted drive axle or drive wheels 12 of the representative motor vehicle 10 shown in FIG. 1, for instance, the 1DOF motion of the rotor 30 ultimately powers the drive wheels 12.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60. Certain applications may be envisioned that make beneficial use of orbiting motion of the output member 25, e.g., when mixing cement, blending a food product, or performing another operation in which simultaneous rotation and orbiting motion is beneficial. Other possible applications may find such 2DOF motion useful, such as in propulsion systems of certain unmanned rovers or other special-purpose vehicles, or in grinders or washing machines.

Referring briefly to FIGS. 3 and 4, the above-noted 2DOF motion is represented schematically via a sequence of motion commencing at time t=0 and continuing until a future point in time t=t+1. FIG. 3 shows an example of cycloidal motion, such that the rotor 30 has rotary motion radially within the surrounding stator 32. Such motion is indicated by the changing position of the instantaneous center of rotation (COR) between t=0 and t=t+1. FIG. 4 shows orbiting motion, such that the rotor 30 effectively slides around the inner circumferential surface 132 of the stator 32. Pure rotary motion, pure orbiting motion, or combinations of rotary and orbiting motion may be used in different applications, as noted above.

Excitation Control: FIGS. 5-8 depict operation of the rotary electric machine 20 at a time instant in which the rotary electric machine 20 operates under peak-load (FIGS. 5 and 7) and partial-load (FIGS. 6 and 8), with FIGS. 5 and 6 describing a motoring/positive torque operating mode and FIGS. 7 and 8 describing a regenerating/negative torque operating load. The rotary electric machine 20, which has left and right halves LH and RH with respect to the instantaneous center of rotation (COR), includes the above-noted rotor 30 and stator 32, with the rotor 30 being eccentric with respect to the stator 32. The stator 32 has a cylindrical stator core 32C with an inner circumferential wall 132. An equal number of stator teeth 32T located in each symmetrical half LH and RH project radially toward the rotor 30 from the inner circumferential wall 132. Stator slots 32S defined between adjacent stator teeth 32T by laminated ferrous structure of the stator 32 are wound with copper wire or bar segment conductors to form the stator electromagnets 32M, which are then sequentially energized by the controller 50 according to the present method to create stator magnetic poles.

Due to the eccentricity of the rotor 30, orbiting motion of the rotor 30 radially within the stator 32 causes the airgap to be larger at a location diametrically opposite the instantaneous center of rotation (COR) of the rotary electric machine 20, i.e., the point at which the stator-rotor airgap is minimized, relative to the size of the airgap in close proximity to the instantaneous center of rotation. The controller 50 is thus configured to receive the input signals (arrow $CC_I$) of FIG. 1, including a torque command indicative of a level of output torque ($T_O$) that is desired, the rotor position signal (arrow $\theta_R$), and the current signals $I_A$, $I_B$, and $I_C$ in the non-limiting example three-phase embodiment. Responsive to the input signals, the controller 50 identifies an optimal stator pole or pole pair located proximate the instantaneous center of rotation (COR) of the rotary electric machine 20, and energizes at least the optimal stator pole or pole pair via the PIM 24 prior to energizing another stator pole or pole pair of the stator 32.

Figures 5, 7:
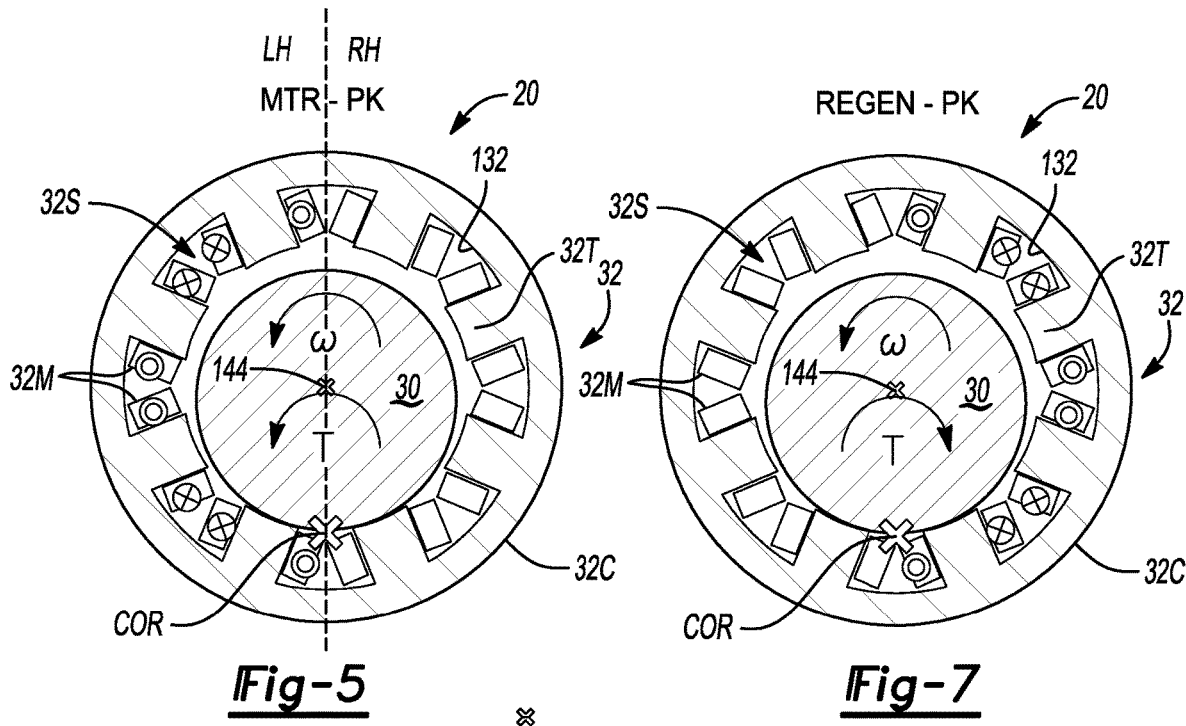
FIGS. 5 and 6 are schematic illustrations of an example 8-phase cycloidal electric machine with controlled stator winding excitation occurring during a motoring operation under peak torque and partial torque conditions, respectively.
FIGS. 7 and 8 are schematic illustrations of the electric machine of FIGS. 5 and 6 depicting stator winding excitation during a regenerating operation under peak torque and partial torque conditions, respectively.
Figures 6, 8:
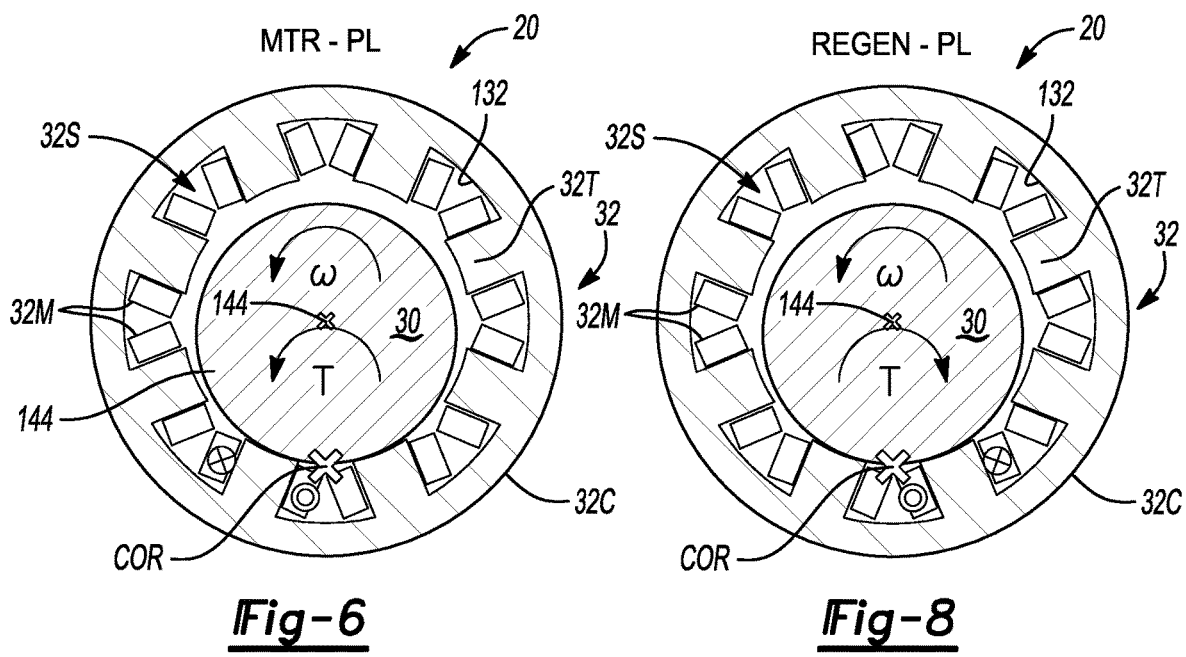

For peak-load and partial-load motoring operations, abbreviated MTR-PK and MTR-PL in FIGS. 5 and 6, respectively, stator windings or coils forming the electromagnets 32M in the left half (LH)/symmetrical plane are energized such that output torque (arrow T) and speed (ω) are in the same direction. Likewise, during a regenerating mode the stator coils forming the electromagnets 32M located in the right half (RH) or symmetrical plane are energized in such that torque (arrow T) and speed (ω) are in opposite directions, with FIG. 7 depicting peak regeneration (REGEN-PK) and all stator electromagnets 32M on right half (RH) energized, and partial load regeneration (REGEN-PT) in FIG. 8 with one such stator electromagnet 32M energized. The controller 50 thus varies between fully-energized and partial-load operation when controlling the electric machine 20, determining in real-time which of the various stator windings or pole pairs to energize, as well as when to energize and when to demagnetize or commute them.

The stator winding for a given electrical phase could span more than one stator slot 32S in some embodiments. The number of such stator slots 32S remains a multiple of the number of electrical phases. Also, whether via use of a predetermined winding direction of the stator windings with respect to the stator teeth 32T or the manner in which the windings are electrically excited, the individual poles of the stator 32 will alternate between north (N) and south (S) around the circumference of the stator 32.

Figure 13B:
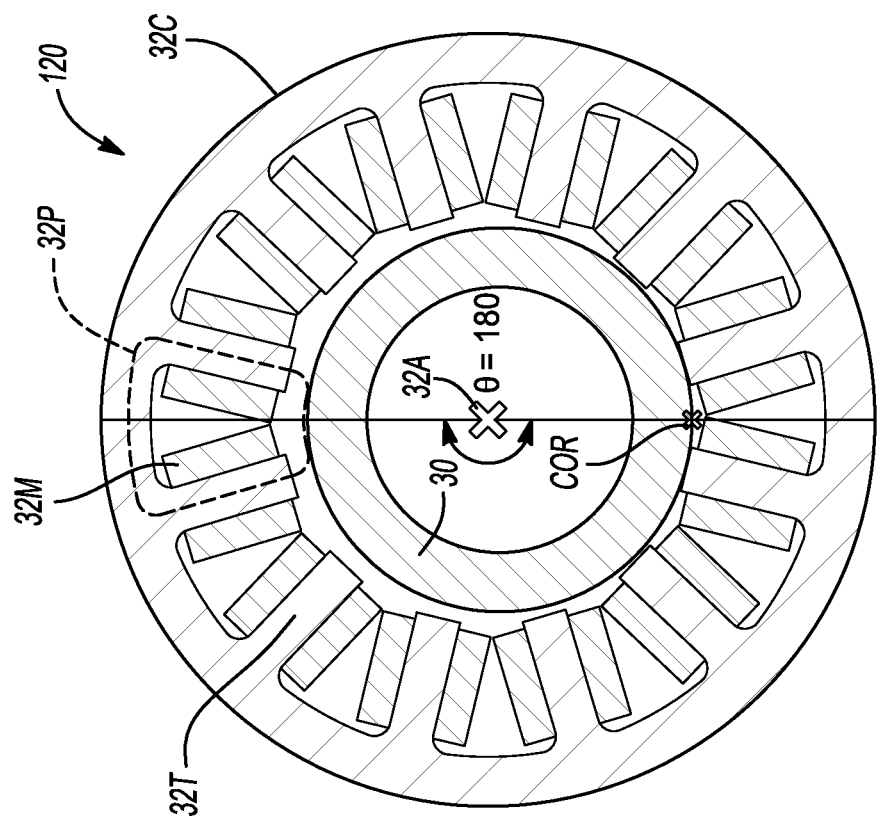
FIGS. 13A and 13B are schematic illustrations of an exemplary twelve-phase embodiment of a rotary electric machine depicting different example sheet angles.
Figure 13A:
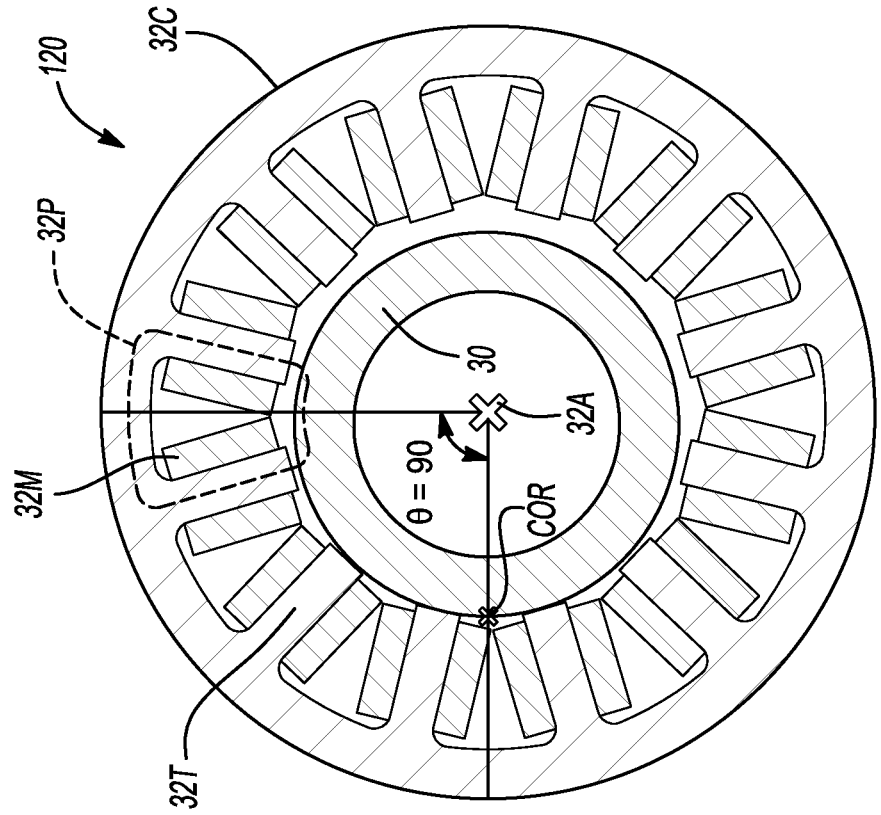

Referring briefly to FIGS. 13A and 13B, assuming the center of the stator 32 is the vertex, for a given position of the rotor 30 each of the stator poles 32P will be arranged at an angle θ with respect to the instantaneous center of rotation (COR), with the illustrated layouts showing a reference stator pole 32P at the top of FIGS. 13A and 13B for two different instantaneous centers of rotation (COR) for which θ equals 90° and 180°, respectively. One ray of the angle θ extends toward the instantaneous center of rotation (COR). The other ray extends toward the mid-point of the reference stator magnetic pole 32P.

Accordingly, torque produced by a stator pole 32P in which 0°<θ<180°, and the torque produced by the stator poles in which −180°<θ<0°, have opposite polarities. Furthermore, torque produced by the respective stator poles 32P increases as |θ| decreases, until the torque peaks at a given angle, which could be determined based on machine parameters, for instance the number of stator poles 32P and airgap function.

FIGS. 9-12 detail operation of an example twelve-phase rotary electric machine 120 under progressively-increasing loads or torque demands, with the twelve phases labeled Ph-1, Ph2, . . . , Ph-12 for clarity. With respect to the instantaneous center of rotation (COR) of the rotary electric machine 120 shown in FIG. 9, one may consider an example case in which the $7^{th}$ and $8^{th}$ phase (Ph-7 and Ph-8) are turned ON from θ=0°, meaning the instantaneous center of rotation (COR) is on the opposite side of the magnetic flux loop formed by the corresponding stator coils, i.e., at the maximum airgap, to θ=180°, meaning the instantaneous center of rotation (COR) is in the exact middle of the magnetic flux loop, i.e., the airgap is at its minimum. In such an instance, the portion of the torque trace 80 corresponding to phases "7+8" is produced on the output member 25. The smoother torque trace 82 is produced once the controller 50 begins commutating phases.

Figure 10:
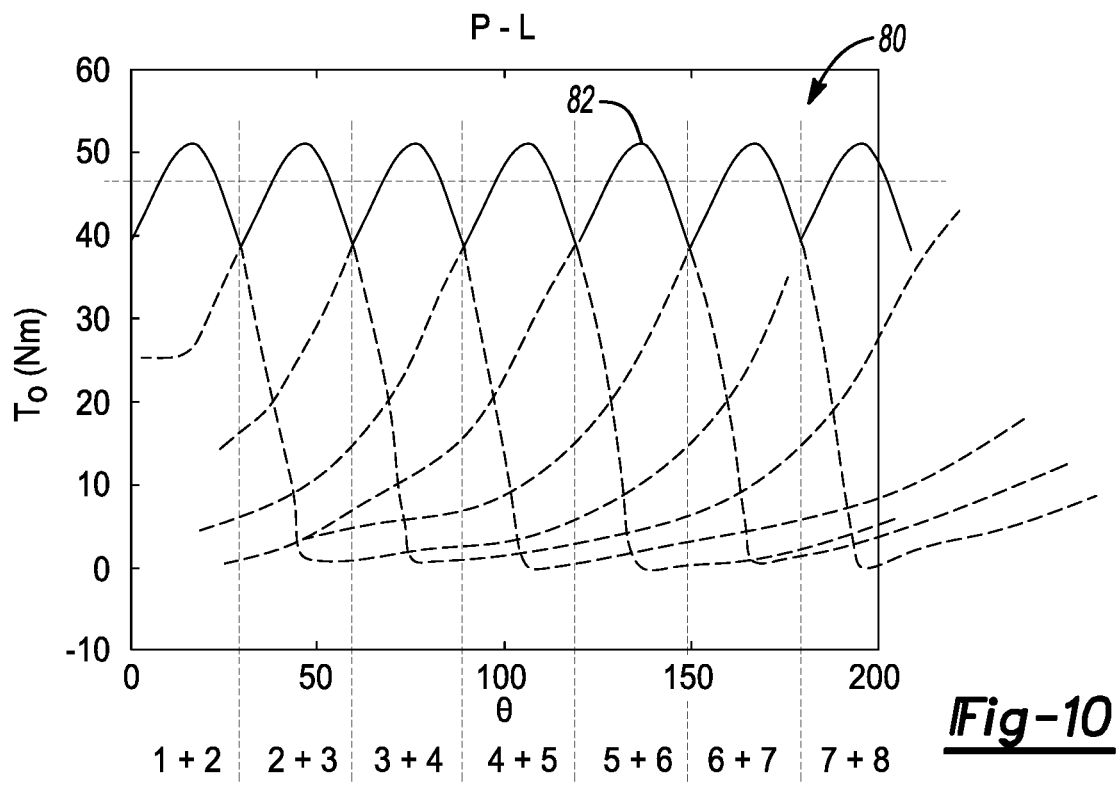
FIG. 10 is a plot of electrical angle (x-axis) in degrees of various energized pole pairs versus output torque in newton-meters for six electrical phases of the cycloidal electric machine shown in FIG. 9 underpartial-load conditions at the onset of an exemplary motoring operation.

Partial-Load Conditions: As will be appreciated, FIG. 10 depicts excitation under partial-load conditions ("P-L") for half a revolution. To extend through the full 360° of a single revolution, FIG. 10 would be extended such that torque trace 80 continues for phase combinations 8+9, 9+10, . . . 12+1, until repeating phase combination 1+2 as shown. The angle (θ), once again, represents the angle of each stator pole with respect to the instantaneous center of rotation (COR) of the rotary electric machine 20. The concept of a current sheet angle as used herein is thus the particular angle or sweep covering the full span of energized stator coils at a given instant in time. Thus, for a hypothetical rotary electric machine with an infinite number of phases, a sheet angle of 0° corresponds to no-load operation and a sheet angle of 180° corresponds to peak load operation.

With respect to the partial-load condition exemplified in FIG. 10, for a given eccentricity (e), a minimum airgap of $g_0$, and a number of stator slots 32S of Ns:

$$T \sim \frac{\cos\frac{\pi}{N_S}\sin\left(\theta + \frac{\pi}{N_S}\right)}{\left(2g_0 - 2e\left(\cos\left(\theta + \frac{\pi}{N_S}\right)\cos\left(\frac{\pi}{N_S}\right) - 1\right)\right)^2}$$

The angle at which torque will peak, i.e., $\theta_{max}$, may be calculated by the controller 50 by taking the derivative of torque with respect to angle θ. FIG. 10 thus depicts torque contributions of each stator coil through a 180° mechanical span, with the smoother torque trace 82 ultimately produced as the controller 50 switches through the full complement of available phases.

The start of the commutation angle of the phases is determined by the controller 50 based on the formulation noted above, and based on calibration data for the particular electric machine 120 being controlled. For partial load operation, which may be detected by the controller 50 when the measured currents are less than a calibrated maximum, each coil is energized or turned ON for a period of 2π/PH, where PH is the number of phases. The phase alone may be turned ON, or this may occur in conjunction with an adjacent phase. If the excitation is in with conjunction with an adjacent phase, then each phase will be ON for 4π/PH, commutating 2π/PH with the phase sitting to the immediate right in FIG. 9 and commutating another 2π/PH with the phase sitting to the immediate left.

The disclosed control strategy enables production of the base level or average output torque ($T_{avg}$) as shown via a torque trace 80 in FIG. 10 as the respective angle θ of each stator coil to the instantaneous center of rotation (COR) changes from 0° toward and beyond 180°, with progressively-changing combinations of immediately adjacent phases, i.e., phase 1+2, 2+3, . . . , 7+8, etc., as the controller 50 sequentially energizes the stator phases. The resulting traces from the torque contributions of such phase pairs is represented by torque trace 80 with its average output torque ($T_{avg}$). As the controller 50 is armed with knowledge of the present rotor position relative to the instantaneous center of rotation in view of the real-time measurements from the position sensor $S_P$ of FIG. 1, the initially-energized phase is determined at the onset of rotation as the phase or phases lying in closest proximity to the above-noted center of rotation.

Figure 9:
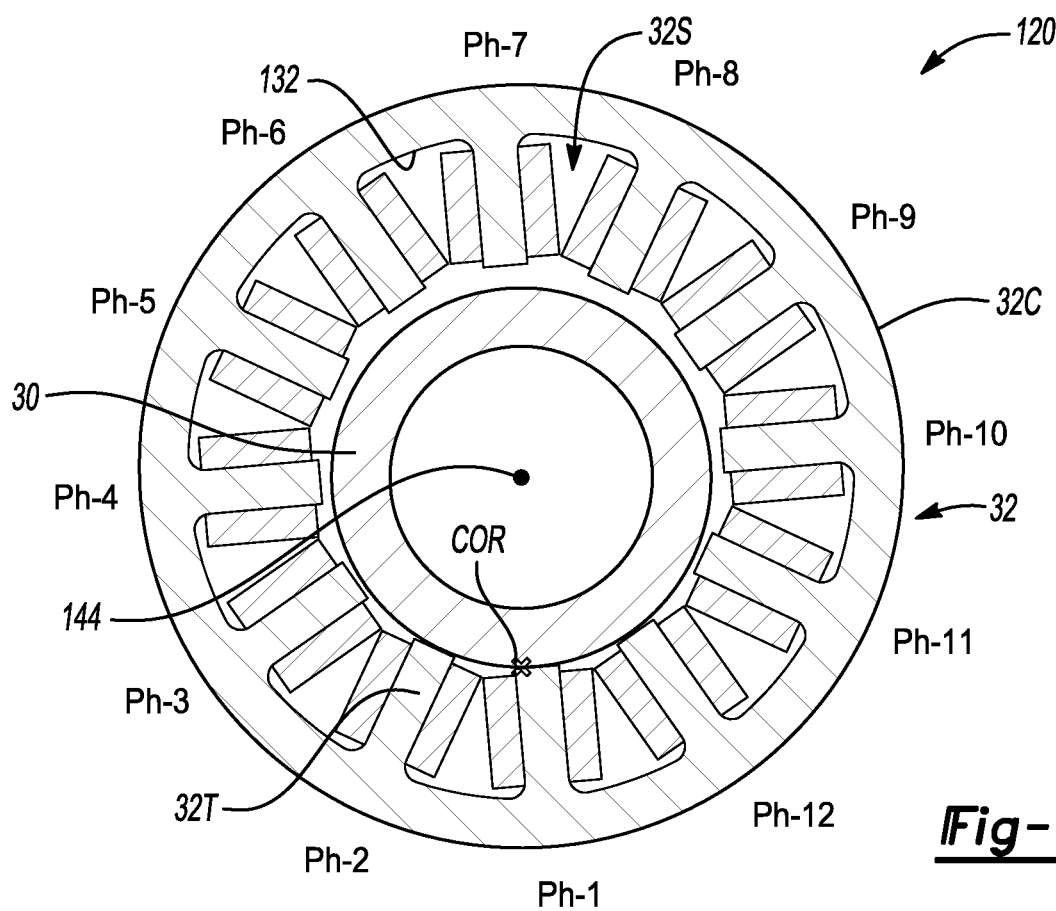
FIG. 9 is a schematic illustration of an example twelve-phase cycloidal electric machine depicting excitation of selected stator windings at the onset of a partial-torque mode of operation.
Figure 11:
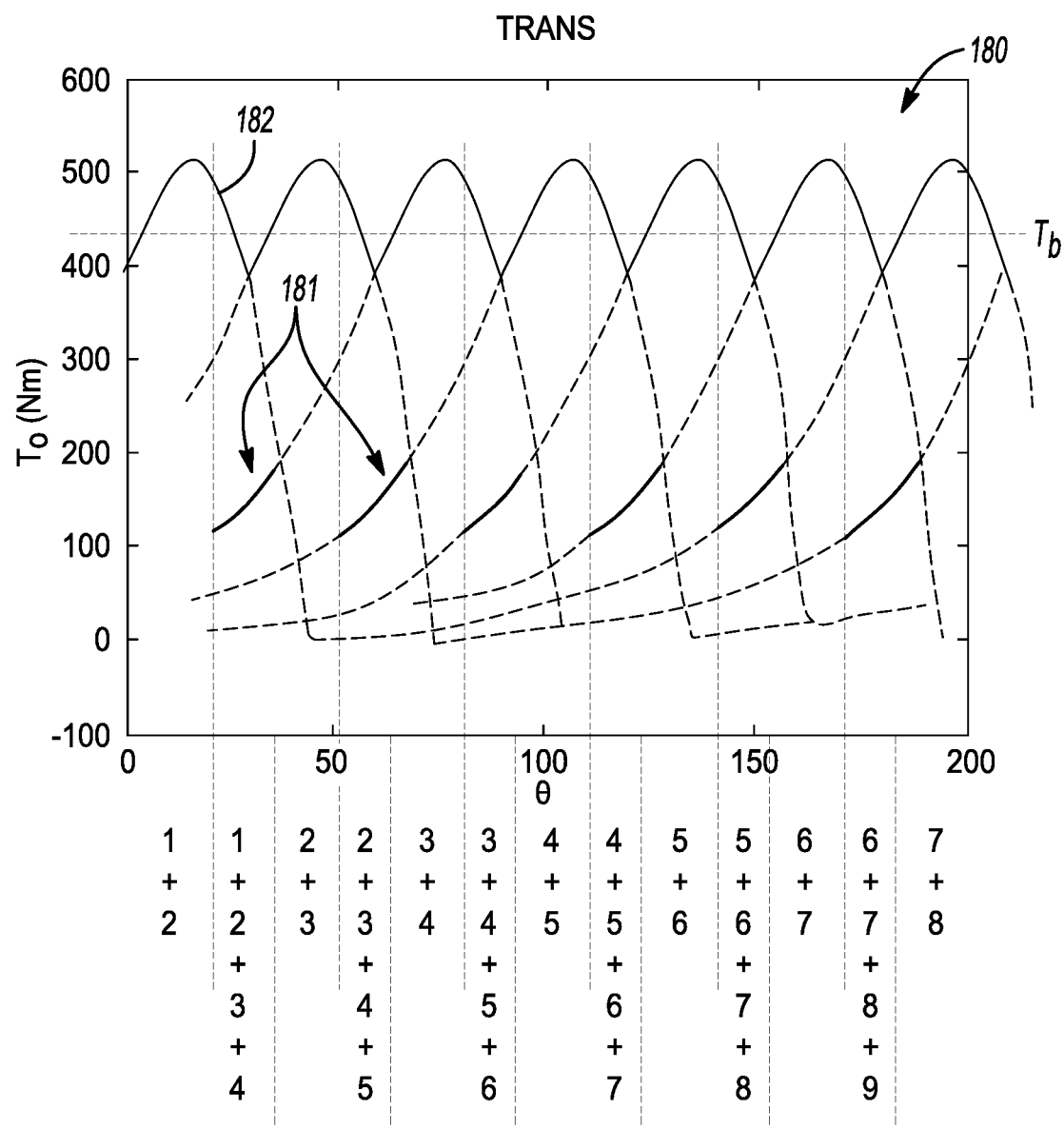
FIG. 11 is a plot of electrical angle (x-axis) in degrees of various energized pole pairs versus output torque during a transitional phase from the partial-load conditions shown in FIG. 10, with increasing torque demand depicted relative to FIG. 10.

Transition: FIG. 11 depicts a torque trace 180 describing control of the electric machine 120 for MTPA operation under increasing but still partial-load conditions, i.e., a transition stage ("TRANS") between the partial-load conditions of FIG. 10 and peak-load conditions of FIG. 12. As the torque command to the rotary electric machine 120 increases and requires a torque contribution above the base level of torque ($T_b$) that the rotary electric machine 120 of FIG. 9 is able to produce, the period of excitation of each stator coil is gradually increased to exceed $$\frac{2\pi}{PH} \text{ or } \frac{4\pi}{PH},$$

depending on whether an individual phase or two adjacent phases are energized, as noted above. The intermittent energizing of four pole pairs in this embodiment provides a temporary torque boost, as indicated by traces 181. Here, the base torque ($T_b$) is the average torque when the excitation angle of the stator 32 is at its maximum. The overlap of timing between phases increases with the torque command, ultimately leading to simultaneous firing of all phases in a given symmetrical half (LH or RH) of the example electric machine 120 of FIG. 12 to reach peak torque. A smoother torque trace 182 is ultimately produced as the controller 50 switches through the full complement of available phases.

Thus, with an increasing torque command short of peak load, the controller 50 may be configured to alternate the energizing of two stator phases with energizing of a multiple thereof, e.g., four stator phases, as a current sheet angle increases from 0° to 180° to provide a transient torque contribution (trace 181). In FIG. 11, for instance, at an angle of θ=0° and initiating energizing of pole or phase pair 1+2 closest to the instantaneous center of rotation, as the rotor 30 rolls to the left and the sheet angle changes, the controller 50 energizes phases 1-4 for the period described herein to provide the torque contribution (trace 181) as a torque boost, then energizes pole pair 2+3, followed by phases 2-5, etc. Thus, for an example twelve-phase embodiment, the controller 50 alternates between energizing two phases and four phases.

Figure 12:
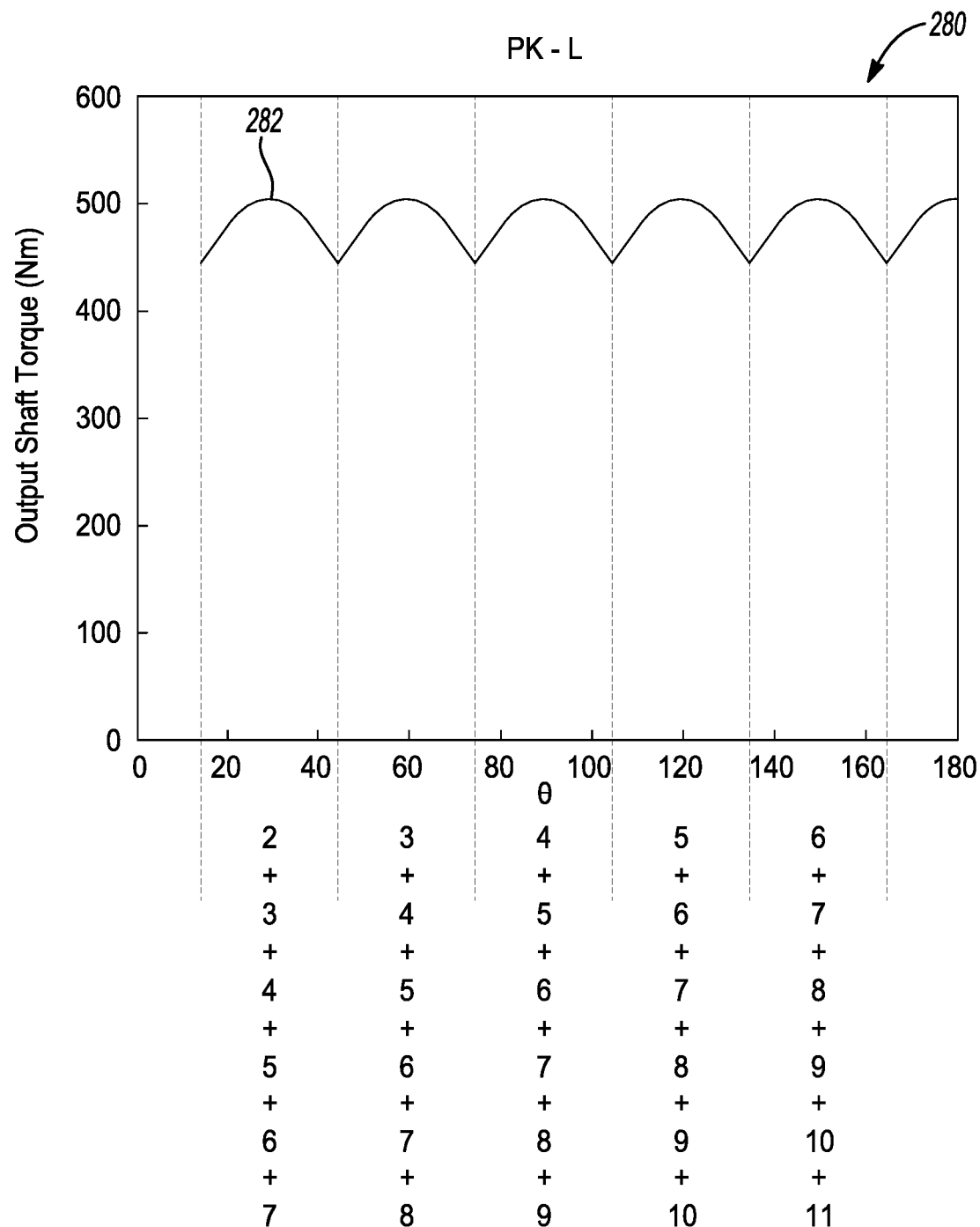
FIG. 12 is a plot of electrical angle (x-axis) in degrees of various energized pole pairs versus output torque corresponding to a peak-load/full excitation state.

Peak-Load Conditions: FIG. 12 shows such a peak load operation ("PK-L") for the same non-limiting example twelve-phase electric machine 120, with performance depicted as trace 280. This is achieved by exciting all of the stator coils located in the half plane, with excitation in the direction of rolling (same speed and torque direction) for a motoring operation. For m phases, therefore, peak-load/peak-torque operation coincides with energizing of $$\frac{m}{2}$$

phases in FIG. 12, with only two phases energized at a given time under partial-load operations (FIG. 10) and between two and fewer than $$\frac{m}{2}$$

phases, e.g., $$\frac{m}{3}$$

phases, energized under the example transitional stage of FIG. 11.

For optimal magnetic performance in the rotary electric machines 20 and 120 of FIGS. 5-9, the stator windings on two consecutive stator slots 32S should be wound so as to constitute opposite magnetic polarities when energized, i.e., alternating north (N) and south (S) poles around the circumference of the stator 32. The number of simultaneously-executed coils and their turn-ON/turn-OFF angles may be optimized based on rotor position, torque command, and operating mode to minimize losses and achieve dynamic control as set forth above. Poles adjacent to the halfplane where the airgap is minimum produce the larger torque, as noted above.

A method for controlling a cycloidal electric machine having the above-described 2DOF of motion will be apparent to one of ordinary skill in the art in view of the disclosure. Such a method may be used for controlling the exemplary eight-phase and twelve-phase machines 20 and 120 described herein, or to machines having other quantities of stators slots 32S, windings, poles, and phases. Such a method may commence with measuring the angular position of the rotor 30 using the position sensor $S_P$ of FIG. 1, and then outputting a rotor position signal indicative of the angular position. Additionally, phase currents to the rotary electric machines 20 or 120 are measured via a plurality of current sensors $S_A$, $S_B$, $S_C$, with such current signals being indicative of the phase currents ($I_A$, $I_B$, $I_C$).

As part of the method, the controller 50 receives the input signals ($CC_I$) of FIG. 1, including a torque command, the rotor position signal, and the current signals, and then uses this information to identify an optimal stator pole or pole pair located proximate the instantaneous center of rotation (COR) of the rotary electric machine 20 or 120. Thereafter, the controller 50 commands energizing of the optimal stator pole or pole pair, via the PIM 24 of FIG. 1 which is in communication with the controller 50, possibly doing so prior to energizing another stator pole or pole pair of the stator. Under partial-load conditions, only the optimal stator pole or pole pair may be energized, particularly at an onset of the partial-torque or load conditions. The optimal stator pole or pole pair and every other stator pole or pole pair located in a given symmetrical half of the rotary electric machine 20 or 120 may be sequentially energized during peak load. Responsive to an increasing torque command, the method may include increasing a period of excitation of each of the stator coils forming electromagnets 32M to exceed $$\frac{2\pi}{PH} \text{ or } \frac{4\pi}{PH},$$

as noted above, with the controller 50 possibly alternating the energizing of two stator phases with energizing of four stator phases in the example twelve-phase embodiment described herein.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
  a direct current (DC) voltage bus;
  an alternating current (AC) voltage bus;
  a power inverter module (PIM) connected to the DC voltage bus and to the AC voltage bus;
  a polyphase cycloidal rotary electric machine connected to the PIM via the AC voltage bus, and having a stator and a rotor with respective stator and rotor axes, wherein the rotor axis is eccentric with respect to the stator axis, an airgap is defined between the stator and the rotor that is smaller at an instantaneous center of rotation of the rotor than elsewhere around a circumference of the rotor, and the rotor moves with two degrees of freedom (2DOF), the 2DOF including rotating motion about the rotor axis and orbiting motion about the stator axis;

a position sensor configured to measure an angular position of the rotor, and to output a rotor position signal indicative of the angular position;

a plurality of current sensors connected to the AC voltage bus and configured to measure phase currents to the rotary electric machine, and to output a set of current signals indicative of the phase currents; and a controller configured to receive a set of input signals, including a torque command, the rotor position signal, and the set of current signals, and responsive to receipt of the input signals, to:

identify an optimal stator pole or pole pair located proximate the instantaneous center of rotation of the rotary electric machine;

energize the optimal stator pole or pole pair via the PIM prior to energizing another stator pole or pole pair of the stator to generate maximum torque per unit amp; and alternate, in response to the torque command being an increasing torque command in which the input signals are indicative of a transition between a partial-load operating condition and a peak-load operating condition, an energizing of at least two of the stator phases with an energizing of a multiple of the at least two stator phases.

2. The electrical system of claim 1, wherein the controller is configured, based on the current signals, to determine when an operating mode of the rotary electric machine is a partial-torque condition, and to energize only the optimal stator pole or pole pair.

3. The electrical system of claim 1, wherein the controller is configured, based on the current signals, to determine when a current operating mode is a peak-torque condition, and to sequentially energize the optimal stator pole or pole pair and every other stator pole or pole pair located in a given symmetrical half of the rotary electric machine, such that when the rotary electric machine has m phases, the controller energizes half of the m phases under the peak-torque condition.

4. The electrical system of claim 1, wherein the rotary electric machine is a cycloidal reluctance machine having at least eight phases.

5. The electrical system of claim 4, wherein the cycloidal reluctance machine has at least twelve phases.

6. The electrical system of claim 1, further comprising a downstream coupling mechanism coupled to the rotor and a driven load, and configured to translate the 2DOF into 1DOF, wherein the 1DOF is the rotating motion without the orbiting motion.

7. The electrical system of claim 6, wherein the driven load is a drive axle of a vehicle.

8. The electrical system of claim 1, wherein the controller is configured, responsive to an increasing torque command, to increase a period of excitation of each of the stator phases to exceed $$\frac{2\pi}{PH},$$

wherein PH is a total number of the stator phases in the rotary electric machine.

9. A method for controlling a cycloidal electric machine having a stator and a rotor with respective stator and rotor axes, wherein the rotor axis is eccentric with respect to the stator axis, an airgap is defined between the stator and the rotor that is smaller at an instantaneous center of rotation of the rotor than elsewhere around a circumference of the rotor, and the rotor moves with two degrees of freedom (2DOF), the 2DOF including rotating motion about the rotor axis and orbiting motion about the stator axis, the method comprising:

measuring an angular position of the rotor using a position sensor, and outputting a rotor position signal indicative of the angular position;

measuring phase currents to the electric machine via a plurality of current sensors, and outputting current signals indicative of the phase currents;

receiving a set of input signals via a controller, including a torque command, the rotor position signal, and the current signals;

identifying, via the controller based on the input signals, an optimal stator pole or pole pair formed from stator coils located proximate the instantaneous center of rotation of the electric machine;

energizing the optimal stator pole or pole pair, via a power inverter module in communication with the controller, prior to energizing another stator pole or pole pair of the stator; and in response to the torque commanded being an increasing torque command indicative of a transition between a partial-load operating condition and a peak-load operating condition, alternating an energizing of at least two stator phases with an energizing of a multiple of the at least two stator phases.

10. The method of claim 9, further comprising:
determining when a current operating mode is a partial-torque condition based on the current signals; and
energizing only the optimal stator pole or pole pair during an onset of the partial-torque condition.

11. The method of claim 9, further comprising:
determining when a current operating mode is a peak-torque condition; and
responsive to the peak-torque condition, energizing the optimal stator pole or pole pair and every other stator pole or pole pair located in a given symmetrical half of the rotary electric machine, such that when the rotary electric machine has m phases, the controller energizes half of the m phases under the peak-torque condition.

12. The method of claim 9, wherein the rotary electric machine is a cycloidal reluctance machine having at least eight phases.

13. The method of claim 12, wherein the cycloidal reluctance machine has twelve phases.

14. The method of claim 9, wherein the rotary electric machine includes a downstream coupling mechanism coupled to the rotor and to a driven load, further comprising translating the 2DOF into 1DOF via the downstream coupling mechanism, wherein the 1DOF is the rotating motion about the rotor axis without the orbiting motion about the stator axis.

15. The method of claim 14, wherein the driven load is a drive axle of a vehicle.

16. The method of claim 9, further comprising:
responsive to an increasing torque command, increasing a period of excitation of each of the stator coils to exceed $$\frac{2\pi}{PH},$$

via the controller, wherein PH is the number of electrical phases of the rotary electric machine.

\* \* \* \* \*